United States Patent
French et al.

(10) Patent No.: US 11,053,995 B2
(45) Date of Patent: Jul. 6, 2021

(54) PARTICLE DAMPING AIRCRAFT WHEEL TORQUE BAR

(71) Applicant: GOODRICH CORPORATION, Charlotte, NC (US)

(72) Inventors: Robert French, Beavercreek, OH (US); Nathaniel John Herrmann, Springfield, OH (US)

(73) Assignee: Goodrich Corporation, Charlotte, NC (US)

( * ) Notice: Subject to any disclaimer, the term of this patent is extended or adjusted under 35 U.S.C. 154(b) by 87 days.

(21) Appl. No.: 16/351,243

(22) Filed: Mar. 12, 2019

(65) Prior Publication Data

US 2020/0292017 A1 Sep. 17, 2020

(51) Int. Cl.
| | |
|---|---|
| *F16D 65/00* | (2006.01) |
| *F16D 65/10* | (2006.01) |
| *B64C 25/42* | (2006.01) |
| *B33Y 80/00* | (2015.01) |

(52) U.S. Cl.
CPC .......... *F16D 65/0006* (2013.01); *B64C 25/42* (2013.01); *F16D 65/10* (2013.01); *B33Y 80/00* (2014.12); *B60B 2900/131* (2013.01); *F16D 2200/0069* (2013.01); *F16D 2250/0061* (2013.01); *F16D 2250/0084* (2013.01)

(58) Field of Classification Search
CPC ......... F16D 65/0006; F16D 2200/0069; F16D 2250/0061; F16D 2250/0084; B64C 25/42; B60B 2900/131
USPC ....................................................... 188/378
See application file for complete search history.

(56) References Cited

U.S. PATENT DOCUMENTS

| | | | |
|---|---|---|---|
| 3,575,270 A * | 4/1971 | Wagenfuhrer | F16D 65/0006 192/107 R |
| 5,699,881 A | 12/1997 | Berwanger et al. | |
| 6,260,676 B1 | 7/2001 | Agnihotri et al. | |
| 2005/0255927 A1 | 11/2005 | Michioka et al. | |
| 2014/0174863 A1* | 6/2014 | Kirkpatrick | F16D 65/0006 188/218 XL |
| 2015/0001008 A1* | 1/2015 | Kirkpatrick | F16D 65/0006 188/71.5 |
| 2017/0138422 A1* | 5/2017 | Riebe | F16D 55/24 |
| 2018/0170816 A1* | 6/2018 | Poteet | C04B 35/78 |
| 2018/0347664 A1 | 12/2018 | Clark | |

(Continued)

FOREIGN PATENT DOCUMENTS

| | | |
|---|---|---|
| CN | 208195696 | 12/2018 |
| EP | 2940340 | 11/2015 |
| WO | 9402753 | 2/1994 |

(Continued)

OTHER PUBLICATIONS

European Patent Office, European Search Report dated Jul. 15, 2020 in Application No. 19214425.1.

*Primary Examiner* — Bradley T King
*Assistant Examiner* — James K Hsiao
(74) *Attorney, Agent, or Firm* — Snell & Wilmer L.L.P.

(57) ABSTRACT

A particle damped torque bar may comprise a body comprising a box beam structure, the body having a neck portion at a first end and an I-beam structure at a second end, wherein the box beam structure extends between the neck portion and the I-beam structure and a cavity within the box beam structure configured to encapsulate a particulate material therewithin.

20 Claims, 7 Drawing Sheets

(56) References Cited

U.S. PATENT DOCUMENTS

2019/0331178 A1* 10/2019 Steele .................. C23C 24/103

FOREIGN PATENT DOCUMENTS

| WO | 2007118254 | 10/2007 |
|----|------------|---------|
| WO | 2010146047 | 12/2010 |

* cited by examiner

PARTICLE DAMPING AIRCRAFT WHEEL TORQUE BAR

FIELD

The disclosure relates generally to aircraft brake systems and aircraft brake torque bars.

BACKGROUND

Aircraft often include one or more landing gear that comprise one or more wheels. A braking system is coupled to the wheel(s) in order to decelerate or park the aircraft. Aircraft braking may induce one or more vibrational loads in the brake system components. These vibrational loads may tend to adversely impact component performance and tend to benefit from damping.

SUMMARY

In various embodiments the present disclosure provides a particle damped torque bar comprising a body comprising a box beam structure, the body having a neck portion at a first end and an I-beam structure at a second end, wherein the box beam structure extends between the neck portion and the I-beam structure, and a cavity within the box beam structure configured to encapsulate a particulate material therewithin.

In various embodiments, the second end further comprises a coupling feature extending over a portion of the I-beam structure. In various embodiments, the coupling feature includes a rail. In various embodiments, the coupling feature includes a fastener hole. In various embodiments, the particulate material comprises at least one of a steel, a stainless steel, a nickel, an alloy, a nickel steel, a silicate, or a ceramic. In various embodiments, the particulate material comprises at least one of spherical, cubical, prismatic, disk, rod, lenticular, conical, frustoconical, triangular, or torroidal shaped particles. In various embodiments, the particulate material has a particle size between 0.001 in and 0.2 in. In various embodiments, the cavity comprises one of a partition or baffle. In various embodiments, the particulate material is encapsulated in the cavity by an additive manufacturing process.

In various embodiments the present disclosure provides a brake assembly for mounting on an axle comprising a brake rotor, a wheel including a wheel disk comprising a hub, and having an outboard lip and an inboard lip defining a rim about the wheel disk extending axially with respect to the hub, and a particle damped torque bar configured to engage with the wheel disk and rotate the brake rotor comprising a body comprising a box beam structure, the body having a neck portion at a first end an I-beam structure at a second end, wherein the box beam structure extends between the neck portion and the I-beam structure, and a cavity within the box beam structure configured to encapsulate a particulate material therewithin.

In various embodiments, the second end further comprises a coupling feature extending over a portion of the I-beam structure. In various embodiments, the coupling feature includes a rail. In various embodiments, the coupling feature includes a fastener hole. In various embodiments, the particulate material comprises at least one of a steel, a stainless steel, a nickel, an alloy, a nickel steel, a silicate, or a ceramic. In various embodiments, the particulate material comprises at least one of spherical, cubical, prismatic, disk, rod, lenticular, conical, frustoconical, triangular, or torroidal shaped particles. In various embodiments, the particulate material has a particle size between 0.001 in and 0.2 in. In various embodiments, the cavity comprises one of a partition or baffle. In various embodiments, the particulate material is encapsulated in the cavity by an additive manufacturing process.

In various embodiments, the present disclosure provides a method of manufacturing a particle damped torque bar comprising forming a box beam structure extending between a neck at a first end and an I-beam structure at a second end, forming a hollow within the box beam structure between the neck and the I-beam structure, disposing a particulate material within the hollow, and coupling a top surface over the hollow to generate a cavity encapsulating the particulate material within the box beam structure. The method may also include forming at least one of a baffle or partition within the cavity.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
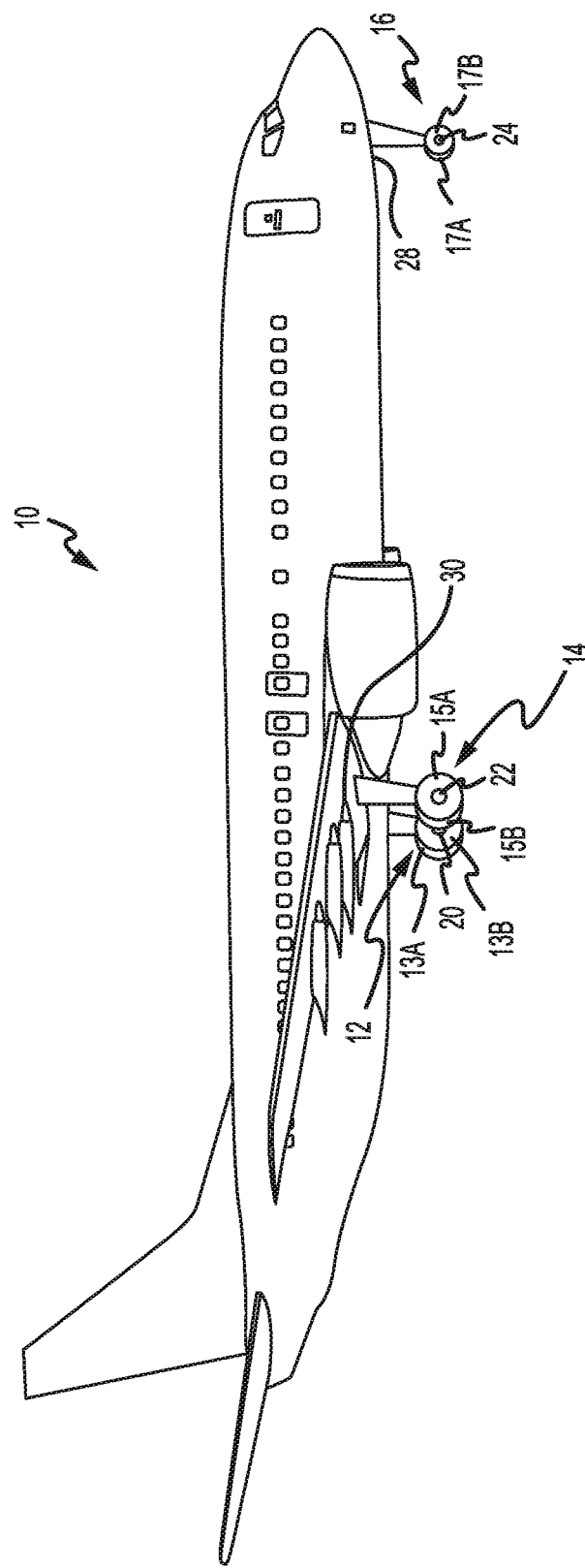
FIG. 1A illustrates an aircraft having a wheel and brake system comprising a particle damped torque bar, in accordance with various embodiments.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

Figure 1B:
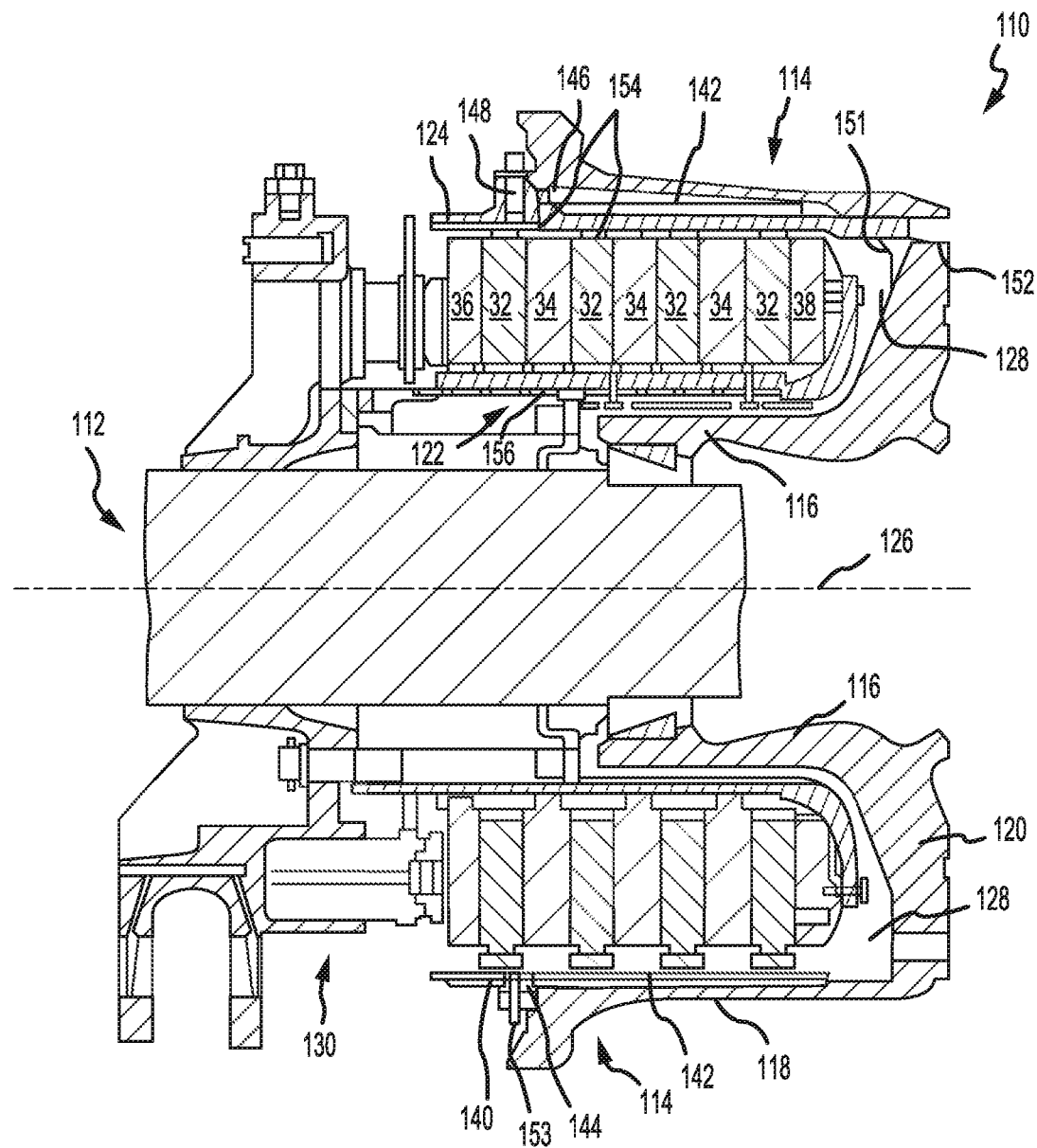
FIG. 1B illustrates a wheel and brake assembly for mounting on an axle comprising a particle damped torque bar, in accordance with various embodiments.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Referring now to FIG. 1B, a wheel and brake assembly for mounting on an axle 110 comprising a particle damped torque bar 124 is located on the aircraft 10 of FIG. 1-A, in accordance with various embodiments. The wheel and brake assembly for mounting on an axle 110 typically comprises a bogie axle 112, a wheel 114 (e.g., the wheels 13A, 13B, 15A, 15B, 17A, 17B of FIG. 1-A) including a hub 116 and wheel well 118, a web 120, a torque take-out assembly 122, one or more particle damped torque bar torque bars 124, a wheel rotational axis 126, a wheel well recess 128, an actuator 130, multiple brake rotors 32, multiple brake stators 34, a pressure plate 36, an end plate 38, a heat shield 140 which may have sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., the interleaved brake rotors 32 and brake stators 34) are disposed in the wheel well recess 128 of the wheel well 118. The brake rotors 32 are typically engaged to the particle damped torque bars 124 for rotating with the wheel 114, while the brake stators 34 are typically engaged with the torque take-out assembly 122. At least one actuator 130 is typically operable to compress the interleaved brake rotors 32 and brake stators 34 for stopping the aircraft 10 of FIG. 1A. In the embodiment of FIG. 1B, the actuator 130 is shown as a hydraulically actuated piston. The pressure plate 36 and end plate 38 are disposed at opposite ends of the interleaved brake rotors 32 and brake stators 34. Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear truck, such as a bogie beam or other landing gear strut, such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from friction between the brake disks while braking the aircraft 10 of FIG. 1A.

Figure 2:
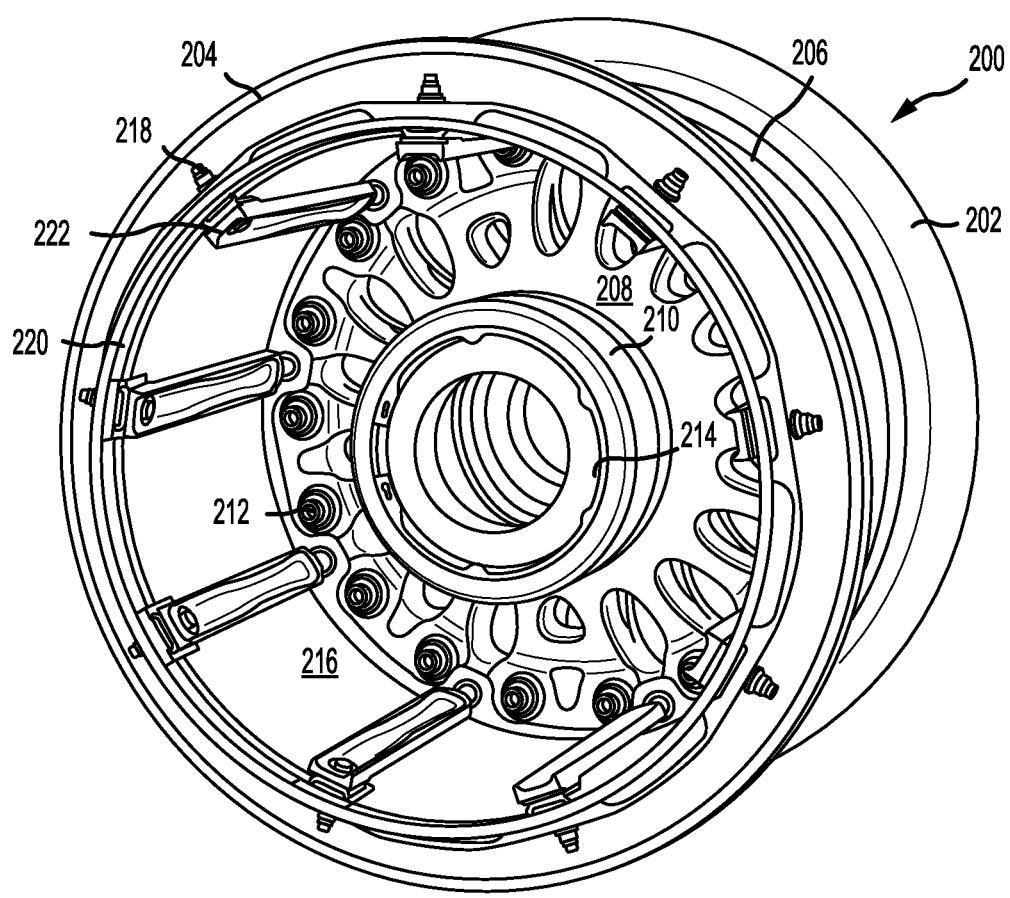
FIG. 2 illustrates a wheel having a particle damped torque bar, in accordance with various embodiments.

According to various embodiments and with reference to FIGS. 1 and 2, a wheel 200 having a particle damped torque bar 222 is provided. Wheel 200 comprises an outboard lip 202, coupled to a wheel disk 208 by wheel tie bolts 212, and an inboard lip 204 defining a rim 206 about the wheel disk 208. A hub 210 is centered through wheel disk 208 and may comprise bearings 214. The rim 206 extends axially with respect to the hub 210 about the circumference of wheel disk 208. A metallic heat shield 216 lies radially inward of rim 206 between inboard lip 204 and wheel disk 208 of wheel 200. The heat shield 216 comprises a cylindrical structure extending circumferentially about the axis of hub 210 around the inner diameter of rim 206. In various embodiments, the heat shield 216 may be coupled proximate rim 206 by fasteners 218 and may be held proximate rim 206, with chin ring 220 proximate inboard lip 204, by an interference between the heat shield 216 and the particle damped torque bar 222. In various embodiments, particle damped torque bar 222 may be coupled to wheel disk 208 at an outboard end and may be coupled to the heat shield 216 at an inboard end proximate chin ring 220 by fasteners 218.

Figure 3A:
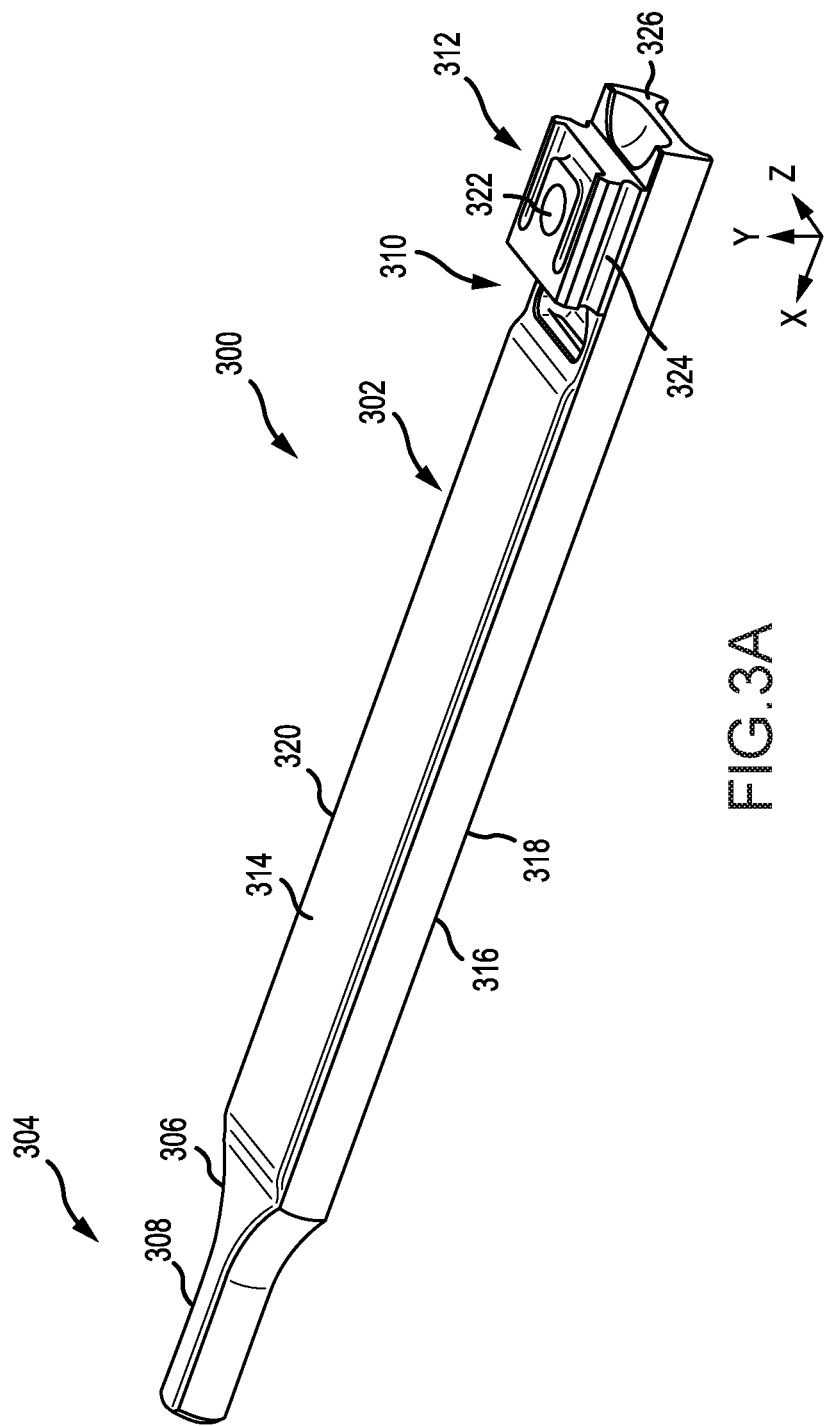
FIG. 3A illustrates a particle damped torque bar, in accordance with various embodiments.
Figure 3B:
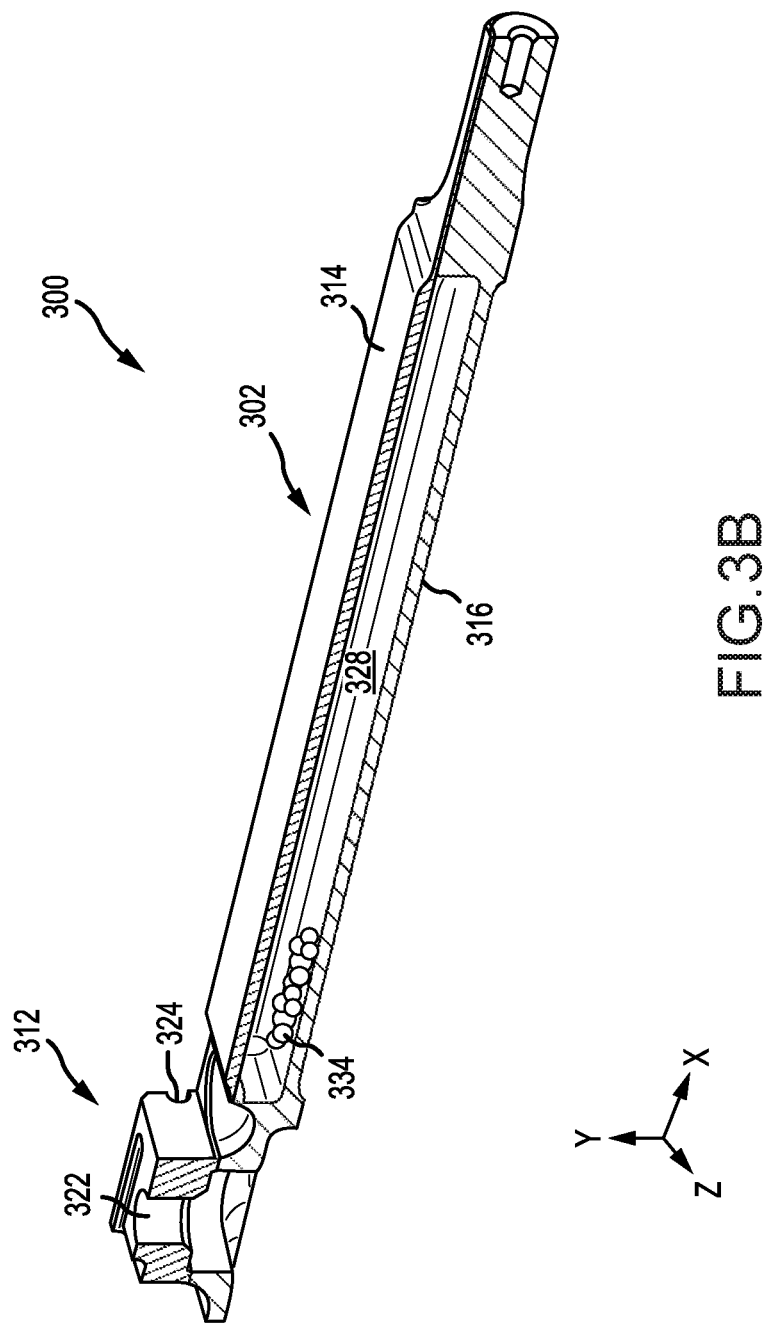
FIG. 3B illustrates a section through a particle damped torque bar, in accordance with various embodiments.

With reference now to FIGS. 3A and 3B, in various embodiments, a particle damped torque bar 300 is provided in perspective, as shown in FIG. 3A and in axial cross section as shown in FIG. 3B. Particle damped torque bar 222 comprises damped torque bar 300. XYZ-axes are provided for reference and FIG. 3B illustrates a cross section in the XY-plane. Particle damped torque bar 300 comprises a body 302 comprising between a top surface 314, a bottom surface 316, a first side 318, and a second side 320 which may define a box beam structure. A first end 304 of body 302 includes a neck portion 306 which has an axial taper (inward from the Y and Z-axes along the X-axis). Neck portion 306 may have a relatively pronounced taper in the Z-axis in comparison to the Y-axis. The neck portion 306 may taper along the X-axis toward a flatted cylindrical portion 308 configured to interface with an aircraft wheel disk such as wheel disk 208. A second end 310 opposite the first end 304 includes a coupling feature 312. Coupling feature 312 may include a fastener hole 322 through the body 302 and parallel rails 324 extending along the X-axis on the respective sides of the coupling feature 312. In various embodiments, the rails 324 may be configured to interface with a chin ring such as chin ring 220. In various embodiments, the second end 310 may comprise an I-beam structure 326 and the coupling feature 312 may extend over a portion of the I-beam structure.

As shown in FIG. 3B, the box beam structure of the body 302 may define a cavity 328 therewithin. Cavity 328 may be filled (partially or entirely) by a particulate material 334 such as, for example, a powder or granular material. In various embodiments, the particulate material may comprise one of a steel, a stainless steel, a tungsten carbide, a nickel, an alloy, a nickel steel (e.g., an austenitic nickel-chromium-based alloy such as that available under the trade name INCONEL), silicate, a ceramic, or other such suitable materials and/or combinations thereof. The particulate material may have a mean particle size between 0.001 in [0.025 mm]

to 0.2 in. [5 mm]. The particulate material may have a relatively uniform particulate shape such as, for example, spherical, cubical, prismatic, disk, rod, lenticular, conical, frustoconical, triangular, or torroidal particles and/or the like. In various embodiments, the particulate material may comprise any number of particulate shapes.

In response to a vibrational load (e.g. a dynamic response initiated between a brake rotor and a brake stator), particle damped torque bar 300 may tend to vibrate and body 302 may transfer the vibratory motion to the particulate material within the cavity 328. Particles of the particulate material may collide with each other and with the side walls of the cavity 328 tending thereby to damp the vibrational loads via frictional losses and particle deformation from the particle collisions. In various embodiments, baffles may extend from any of the side walls into cavity 328 increasing the internal surface area of cavity 328. In various embodiments, cavity 328 may be divided into a plurality of cavities and each of the plurality may be filled with the particulate material. In various embodiments, the plurality of cavities may be fluidly isolated and may contain the same particulate material or may each contain various differing particulate materials (i.e., a first particulate material, a second particulate material, a third particulate material). In various embodiments the plurality of cavities may be in communication such that the particulate material may flow between respectively adjacent cavities. In various embodiments, the amount and composition of particulate material within cavity 328 may be tailored to damp a desired vibrational load. In various embodiments, a particle damped torque bar may be tuned to reduce vibration g-levels by greater than 10% across a frequency range of 10 Hz to 4,000 Hz. In various embodiments, a particle damped torque bar may be tuned to reduce vibration g-levels by greater than 50% at frequencies greater than 1,000 Hz.

Figure 3C:
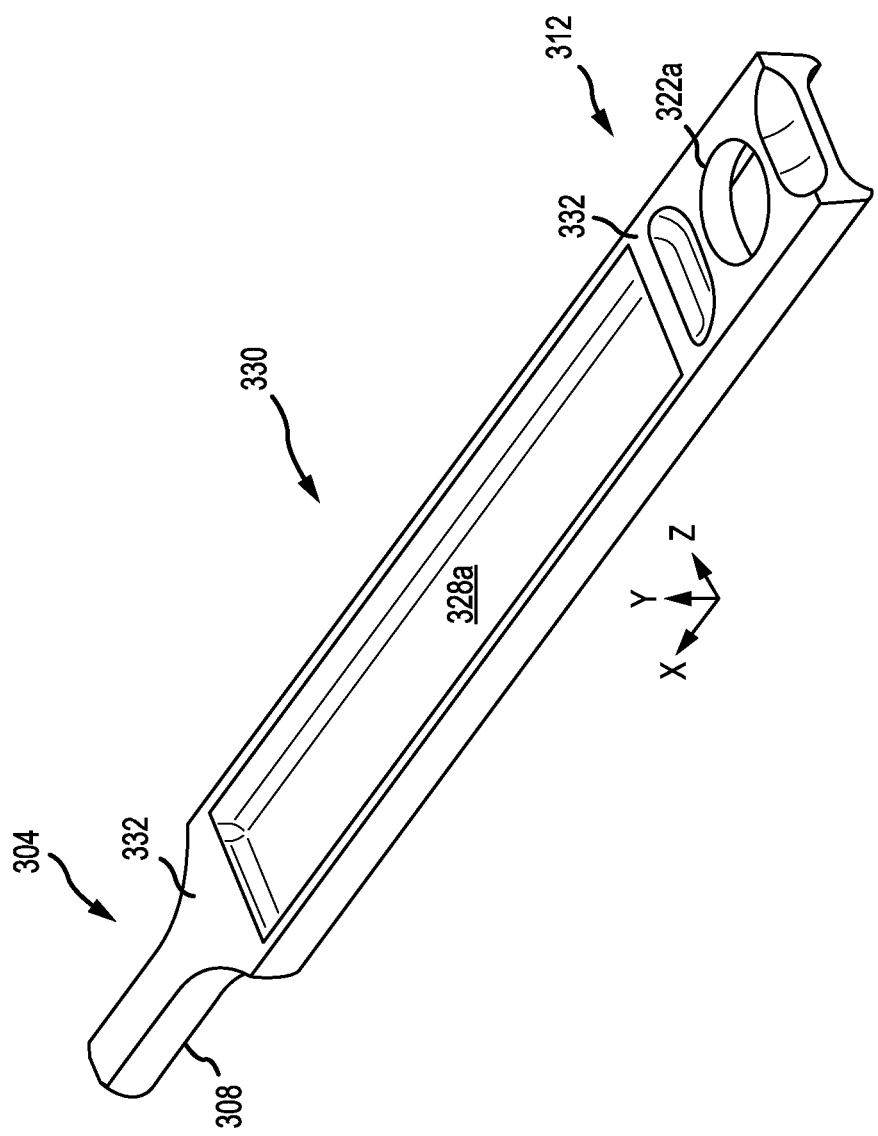
FIG. 3C illustrates a lower portion of a particle damped torque bar, in accordance with various embodiments.

Particle damped torque bar 300 may be formed, for example, by any of casting, forging, machining, additive manufacture, or combination thereof. In various embodiments and as shown with additional reference to FIG. 3C, a lower portion 330 (e.g., a forged portion or a cast portion) of particle damped torque bar 300 body 302 may be formed (such as by casting or forging) having a hollow 328a within the box beam structure between the neck portion 306 and the I-beam structure 326. The hollow 328a may be further defined by the bottom surface 316, the first side 318, and the second side 320 of the box beam structure and open at a flush deck 332 for filling with the particulate material. In like regard, the first end 304 may be forged or turned to form the neck portion 306 and flatted cylindrical portion 308. In various embodiments, deck 332 may extend along the lower portion 330 at the first end 304 and the second end 310 tending thereby to provide a platform on the lower portion 330 for additive manufacturing deposition.

Similarly, the second end 310 may be forged or milled to form the I-beam structure 326. In various embodiments, the lower portion 330 may include a fastener hole 322a having a diameter greater than that of the fastener hole 322. Hollow 328a may be filled with the particulate material and the top surface 314 may be coupled to lower portion 330 of the body 302 to form cavity 328 and enclose the particulate material therewithin. In various embodiments, the top surface 314 and the coupling feature 312 may be additively manufactured (e.g., printed) over the deck 332 of lower portion 330 and in response enclose the particulate material. In various embodiments, the particle damped torque bar 300 may be additively manufactured such as, for example, by a powdered metal printing technique using a powdered metal. In various embodiments, the particulate material 334 may comprise a portion of the powdered metal used in the powdered metal printing technique.

Figure 4:
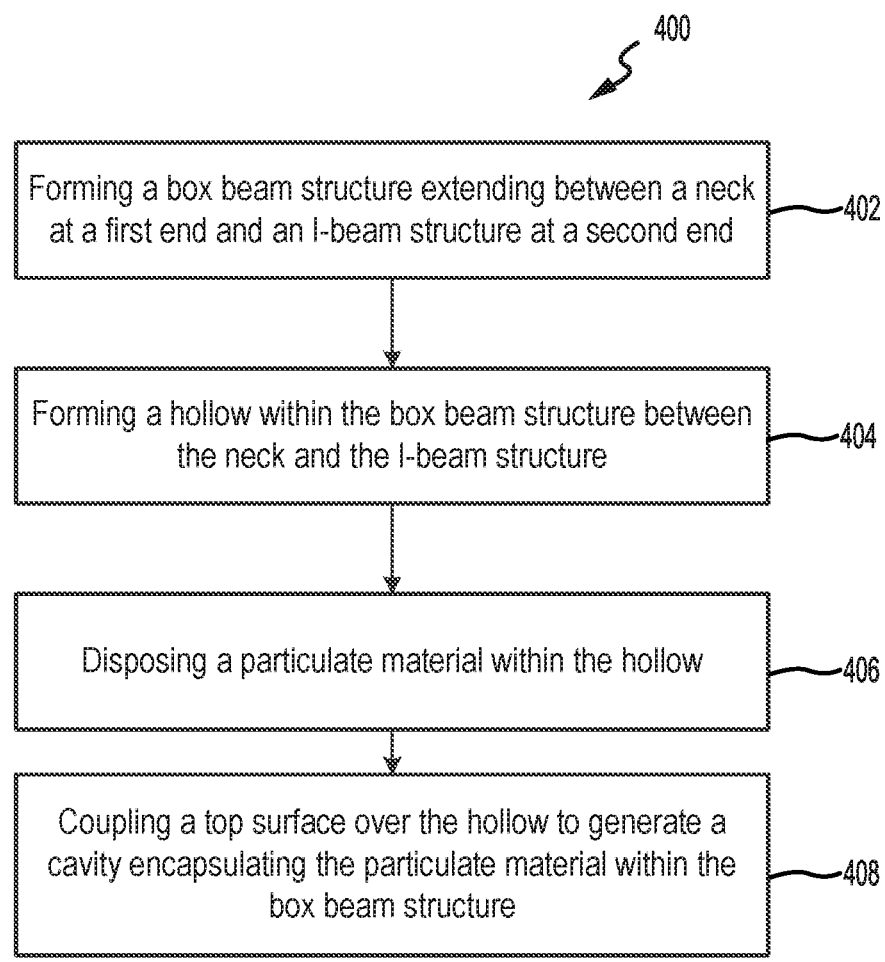
FIG. 4 illustrates a method of manufacturing a particle damped torque bar, in accordance with various embodiments.

In various embodiments and with reference now to FIG. 4, a method 400 of manufacturing a particle damped torque bar may comprise forming a box beam structure extending between a neck at a first end and an I-beam structure at a second end (step 402). Method 400 includes forming a hollow within the box beam structure between the neck and the I-beam structure (step 404). Method 400 includes disposing a particulate material within the hollow (step 406). Method 400 includes coupling a top surface over the hollow to generate a cavity encapsulating the particulate material within the box beam structure (step 408). In various embodiments, step 408 may include forming one of a partition or a baffle within the cavity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A particle damped torque bar, comprising:
a body comprising a box beam structure;
the body having a neck portion at a first end and an I-beam structure at a second end,
wherein the box beam structure extends between the neck portion and the I-beam structure; and
a cavity within the box beam structure configured to encapsulate a particulate material therewithin,
wherein the cavity is only partially filled by the particulate material, and
wherein the cavity further comprises a plurality of at least one of baffles or partitions configured to reduce vibration g-levels response to an interaction between the particulate material and the baffles.

2. The particle damped torque bar of claim 1, wherein the second end further comprises a coupling feature extending over a portion of the I-beam structure.

3. The particle damped torque bar of claim 2, wherein the coupling feature includes at least one of a rail and a fastener hole.

4. The particle damped torque bar of claim 1, wherein the plurality of at least one of baffles or partitions is configured to reduce vibration g-levels by greater than 10% across a frequency range of 10 Hz to 4,000 Hz in.

5. The particle damped torque bar of claim 4, wherein the plurality of at least one of baffles or partitions is configured to reduce vibration g-levels by greater than 50% at frequencies greater than 1,000 Hz.

6. The particle damped torque bar of claim 1, wherein the particulate material comprises at least one of a steel, a stainless steel, a tungsten carbide, a nickel, an alloy, a nickel steel, a silicate, or a ceramic.

7. The particle damped torque bar of claim 1, wherein the particulate material comprises at least one of spherical, cubical, prismatic, disk, rod, lenticular, conical, frustoconical, triangular, or torroidal shaped particles.

8. The particle damped torque bar of claim 1, wherein the particulate material has a particle size between 0.001 in and 0.2 in.

9. The particle damped torque bar of claim 1, wherein the plurality of at least one of baffles or partitions is configured to reduce vibration g-levels by greater than 50% at frequencies greater than 1,000 Hz.

10. A brake assembly for mounting on an axle comprising:
a brake rotor;
a wheel including a wheel disk comprising a hub, and having an outboard lip and an inboard lip defining a rim about the wheel disk extending axially with respect to the hub; and
a particle damped torque bar configured to engage with the wheel disk and rotate the brake rotor comprising:
a body comprising a box beam structure;
the body having a neck portion at a first end and an I-beam structure at a second end,
wherein the box beam structure extends between the neck portion and the I-beam structure; and
a cavity within the box beam structure configured to encapsulate a particulate material therewithin,
wherein the cavity is only partially filled by the particulate material, and
wherein the cavity further comprises a plurality of at least one of baffles or partitions configured to reduce vibration g-levels response to an interaction between the particulate material and the baffles.

11. The brake assembly of claim 10, wherein the second end further comprises a coupling feature extending over a portion of the I-beam structure.

12. The brake assembly of claim 11, wherein the coupling feature includes at least one of a rail and a fastener hole.

13. The brake assembly of claim 10, wherein the plurality of at least one of baffles or partitions is configured to reduce vibration g-levels by greater than 10% across a frequency range of 10 Hz to 4,000 Hz in.

14. The brake assembly of claim 13, wherein the plurality of at least one of baffles or partitions is configured to reduce vibration g-levels by greater than 50% at frequencies greater than 1,000 Hz.

15. The brake assembly of claim 10, wherein the particulate material comprises at least one of a steel, a stainless steel, a tungsten carbide, a nickel, an alloy, a nickel steel, a silicate, or a ceramic.

16. The brake assembly of claim 10, wherein the particulate material comprises at least one of spherical, cubical, prismatic, disk, rod, lenticular, conical, frustoconical, triangular, or torroidal shaped particles.

17. The brake assembly of claim 10, wherein the particulate material has a particle size between 0.001 in and 0.2 in.

18. The brake assembly of claim 10, wherein the plurality of at least one of baffles or partitions is configured to reduce vibration g-levels by greater than 50% at frequencies greater than 1,000 Hz. wherein particulate material is encapsulated in the cavity by an additive manufacturing process.

19. A method of manufacturing a particle damped torque bar, the method comprising:
forming a box beam structure extending between a neck at a first end and an I-beam structure at a second end;
forming a hollow within the box beam structure between the neck and the I-beam structure;
disposing a particulate material within the hollow; and
coupling a top surface over the hollow to generate a box beam structure and a cavity encapsulating the particulate material within the box beam structure
wherein the cavity is only partially filled by the particulate material, and
wherein the cavity further comprises a plurality of at least one of baffles or partitions configured to reduce vibration g-levels by greater than 10% across a frequency range of 10 Hz to 4,000 Hz in response to an interaction between the particulate material and the baffles.

20. The method of claim 19, wherein the plurality of at least one of baffles or partitions is configured to reduce vibration g-levels by greater than 50% at frequencies greater than 1,000 Hz.

* * * * *

UNITED STATES PATENT AND TRADEMARK OFFICE
CERTIFICATE OF CORRECTION

PATENT NO. : 11,053,995 B2
APPLICATION NO. : 16/351243
DATED : July 6, 2021
INVENTOR(S) : Robert French Page 1 of 1

It is certified that error appears in the above-identified patent and that said Letters Patent is hereby corrected as shown below:

In the Claims

In Claim 18, Column 8, Line 37, please delete "wherein particulate material is encapsulated in the cavity by an additive manufacturing process"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*